(12) United States Patent
Craft et al.

(10) Patent No.: US 9,759,200 B2
(45) Date of Patent: Sep. 12, 2017

(54) WIND TOWER AND WIND FARM INSPECTIONS VIA UNMANNED AIRCRAFT SYSTEMS

(71) Applicant: General Electric Company, Schenectady, NY (US)

(72) Inventors: David Glenn Craft, Fountain Inn, SC (US); Christopher Edward Thompson, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 413 days.

(21) Appl. No.: 14/335,115

(22) Filed: Jul. 18, 2014

(65) Prior Publication Data

US 2016/0017866 A1    Jan. 21, 2016

(51) Int. Cl.
*H04N 13/02*    (2006.01)
*F03D 11/00*    (2006.01)
*H04N 7/18*    (2006.01)
*F03D 17/00*    (2016.01)

(52) U.S. Cl.
CPC .......... *F03D 11/0091* (2013.01); *F03D 17/00* (2016.05); *H04N 7/185* (2013.01); *B64C 2201/127* (2013.01)

(58) Field of Classification Search
CPC ..... F03D 11/0091; F03D 17/00; H04N 7/185; Y02E 10/722; B64C 2201/127

USPC .......................................................... 348/46
See application file for complete search history.

(56) References Cited

U.S. PATENT DOCUMENTS

2013/0317667 A1*  11/2013  Kruglick ............... B64C 39/024
                                                                  701/2
2014/0168420 A1*   6/2014  Naderhirn ............... F03D 17/00
                                                                  348/128

FOREIGN PATENT DOCUMENTS

| CN | 103135550 A | 6/2013 |
|----|-------------|--------|
| CN | 103454556 A | 12/2013 |
| JP | 2005265699 A | 9/2005 |

* cited by examiner

*Primary Examiner* — Allen Wong
(74) *Attorney, Agent, or Firm* — GE Global Patent Operation; Douglas D. Zhang

(57) ABSTRACT

An unmanned aircraft system (UAS) to inspect equipment and a method of inspecting equipment with the UAS are described. The UAS includes a scanner to obtain images of the equipment and a memory device to store information for the UAS. The UAS also includes a processor to determine a real-time flight path based on the images and the stored information, and a camera mounted on the UAS to obtain camera images of the equipment as the UAS traverses the real-time flight path.

8 Claims, 4 Drawing Sheets

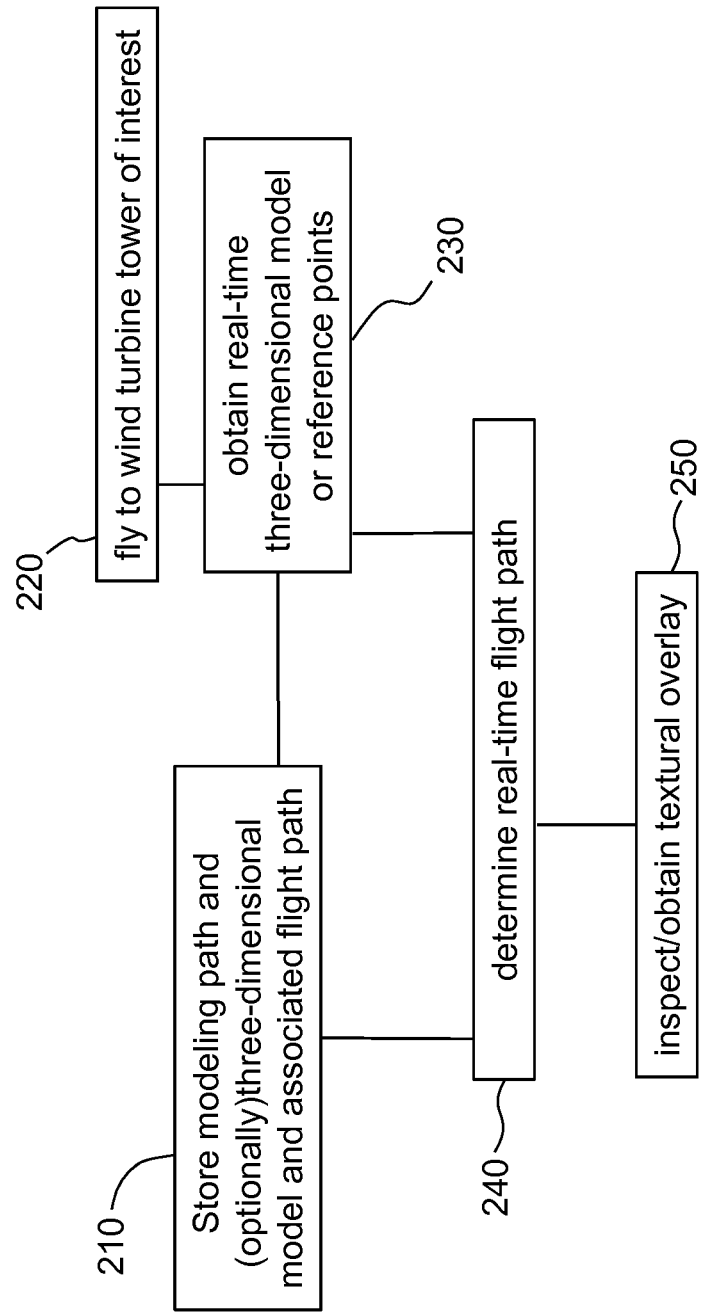

WIND TOWER AND WIND FARM INSPECTIONS VIA UNMANNED AIRCRAFT SYSTEMS

BACKGROUND OF THE INVENTION

The subject matter disclosed herein relates to wind tower and wind farm inspections via unmanned aircraft systems (UAS). A wind turbine tower converts kinetic energy from wind into electrical power. An array of wind turbine towers in a wind farm may be located onshore and offshore and may generate thousands of mega Watts (MW) of power. An exemplary wind turbine tower may be 500 meters (m) tall and have a diameter of 100 m. Tower height can affect power generation capacity. This is because wind speeds increase with elevation such that a wind turbine located higher can capture more energy. Details of the blades (e.g., blade count) of the rotor of the wind turbine can also affect power generation. The blades may have an airfoil shape, for example.

BRIEF DESCRIPTION OF THE INVENTION

According to one aspect of the invention, an unmanned aircraft system (UAS) to inspect equipment includes a scanner configured to obtain images of the equipment; a memory device configured to store information for the UAS; a processor configured to determine a real-time flight path based on the images and the stored information; and a camera mounted on the UAS configured to obtain camera images of the equipment as the UAS traverses the real-time flight path.

According to another aspect of the invention, a method of inspecting equipment with an unmanned aircraft system (UAS) includes obtaining images of the equipment; obtaining, from a memory device, stored information for the UAS; determining, using a processor, a real-time flight path for the UAS based on the images and the stored information; and obtaining camera images of the equipment, using a camera of the UAS, while traversing the real-time flight path with the UAS.

According to yet another aspect of the invention, a computer-readable medium on an unmanned aircraft system (UAS) stores instructions which, when processed by a processor of the UAS, cause the processor to implement a method of inspecting equipment. The method includes obtaining images of the equipment; obtaining stored information for the UAS; determining a real-time flight path for the UAS based on the images and the stored information; and obtaining camera images of the equipment, using a camera of the UAS, while traversing the real-time flight path with the UAS.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 2 is a process flow of a method of performing an inspection with an inspection UAS according to embodiments of the invention;

The detailed description explains embodiments of the invention, together with advantages and features, by way of example with reference to the drawings.

DETAILED DESCRIPTION OF THE INVENTION

As noted above, wind turbine towers (and wind farms that include an array of the towers) can generate thousands of MW of power. Regular inspection and maintenance of the blades and exterior of a wind turbine tower can increase the useful life of the wind tower and the wind farm. The inspection of wind turbine towers is complicated by their size and the distance between wind towers. Two current approaches both require a person to do the inspection. In one approach, the person is lifted up in a crane, and, in the other, the person may conduct an inspection while repelling down the wind turbine tower. Either approach can be not only time consuming but also incomplete, because not every area of the wind tower will be accessible for inspection. Parts of the turbine may be lowered to the ground for inspection, as well. This approach is also time consuming and can be cost-prohibitive. Embodiments of the systems and methods described herein relate to inspecting wind turbine towers via unmanned aircraft systems (UAS) or platforms.

Figure 1:
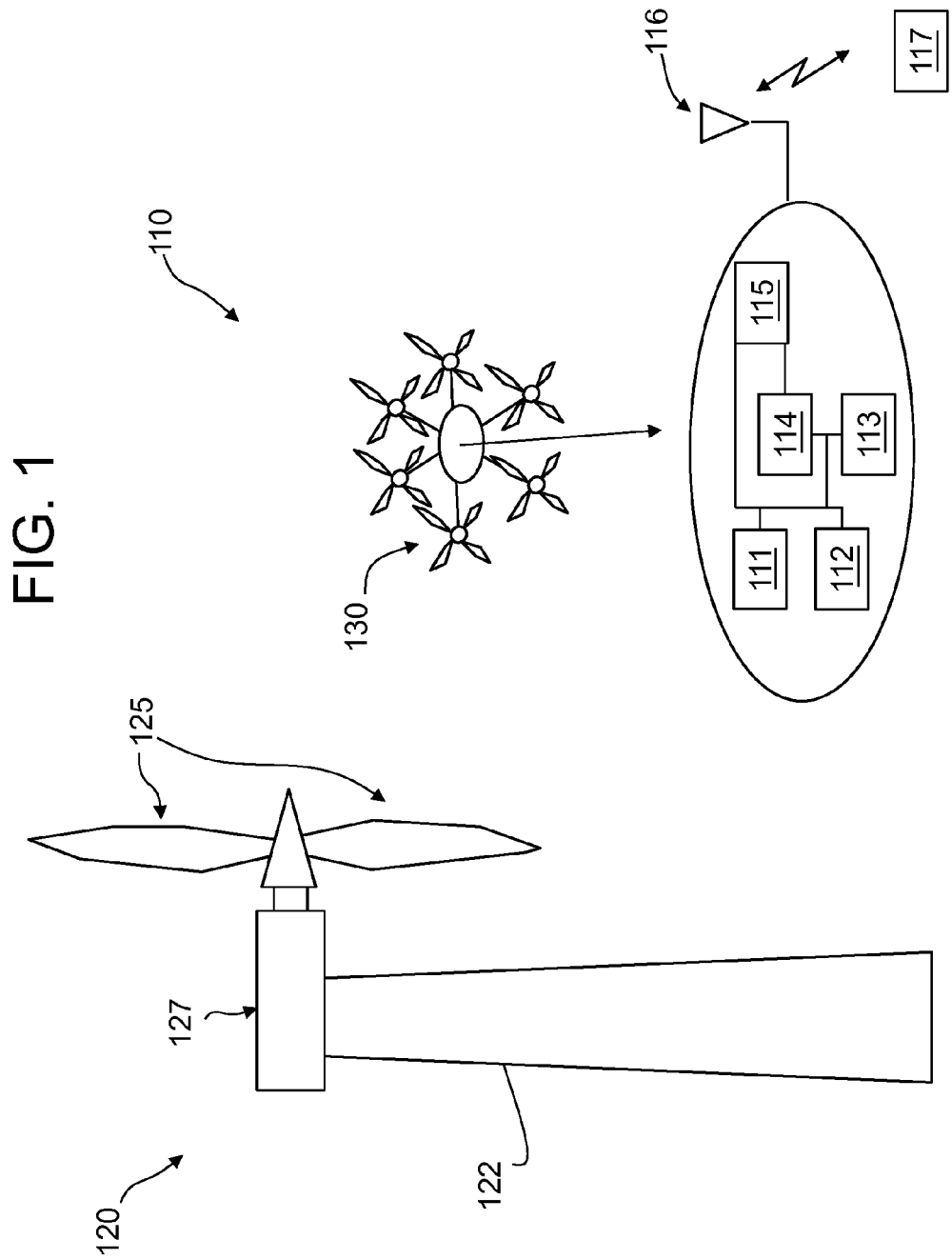
FIG. 1 illustrates a wind turbine tower and an inspection UAS according to an embodiment of the invention.

FIG. 1 illustrates a wind turbine tower 120 and an inspection UAS 110 according to an embodiment of the invention. The wind turbine tower 120 includes a base 122, multiple blades 125, and other components 127 (e.g., rotor shaft, gearbox) that harness the wind energy. According to an exemplary embodiment, the wind turbine tower 120 may include three blades 125 that are arranged 120 degrees apart from each other, with each blade spanning 20 to 60 m in length. While embodiments of the invention are not limited by the number of blades 125 and their arrangement, that information is known prior to operation of the inspection UAS 110 as detailed below. The location of each wind turbine tower 120 (e.g., based on global positioning system (GPS) coordinates) within a wind farm is also typically known prior to operation of the inspection UAS 110. Operation of each wind turbine tower 120 is suspended prior to inspection. Thus, the blades 125 are stationary, but their position may not be known prior to the inspection process described below.

The inspection UAS 110 according to the embodiment shown in FIG. 1 includes at least one rotor 130. An exemplary inspection UAS 110 may be a rotorcraft and, as depicted in FIG. 1, is a hex rotor with six rotors 130. The rotors 130 may be used for steering based on a speed differential among rotors 130 that results in a tilt, and the rotors 130 may also be used to move the inspection UAS 110 up and down. While an exemplary arrangement and function of the rotors 130 is described and shown, embodiments of the invention are not limited based on the shape, size, or mode of movement of the inspection UAS 110. The inspection UAS 110 includes a camera 111, which may be a high resolution camera with a variable focal lens and at least 12 megapixels. The inspection UAS 110 also includes a three-dimensional scanner 112, which may be a laser scanner, for example. The scanner 112 analyzes the wind turbine tower 120 to collect data on its shape and may construct a digital three-dimensional model or obtain reference points (a less detailed model indicating the orientation of the blades 125 and other details). As further detailed below, the inspection UAS 110 may construct this three-dimensional model or obtain the reference points during an initial flyby of the wind turbine tower 120 to facilitate determination of a flight path (real-time flight path 410, FIG. 4) for the inspection UAS 110. The camera 111 and scanner 112 facilitate photogrammetry, which refers to creating a three-dimensional model of an object using software to stitch together many images taken at different focal lengths. The images may be combined with range finding data to improve accuracy.

The inspection UAS 110 also includes one or more memory devices 113 (e.g., a computer-readable medium) that store instructions (e.g., rules for generating the real-time flight path 410 based on the real-time three-dimensional model 400), models, and associated paths (e.g., stored paths that may be adjusted based on a comparison of real-time conditions with the associated models to determine the real-time flight path 410), as further discussed below. One or more processors 114 process information from the camera 111, scanner 112, and memory device 113 based on the instructions stored in the memory device 113. The camera 111 and scanner 112 may additionally provide information to an interface 115 directly or through the processor 114. The interface 115 may transmit the information wirelessly to a monitoring or control site 117 that is remote to the wind turbine tower 120 by some distance (on the order of a few hundred meters to a few miles). The interface 115 may transmit information to another inspection UAS 110 that is used in conjunction to conduct the inspection. The interface 115 may use one or more antennas 116 for communication and may receive information or commands as well as transmit. The flight functionality (control of the rotors 130, 135 to maneuver the inspection UAS 110) may be performed with the one or more processors 114 or a dedicated flight control processor.

FIG. 2 is a process flow of a method of performing an inspection with an inspection UAS 110 according to embodiments of the invention. While the discussion herein is with specific reference to the inspection of wind turbine towers 120 as exemplary equipment being inspected, other equipment or facilities may be inspected according to the embodiments described herein. Based on the equipment being inspected, the camera 111 may be a different type of camera (e.g., infrared), for example, or multiple types of cameras 111 may be deployed. At block 210, the process includes storing the modeling path 310 and (optionally) a stored three-dimensional model and the associated stored flight path. The information may be stored in the memory device 113, for example. Storing the modeling path 310 is discussed with reference to block 230, and storing one or more three-dimensional models and associated stored flight path is discussed with reference to block 240. At block 220, flying to the wind turbine tower 120 of interest includes the inspection UAS 110 being provided with GPS coordinates, for example, and the processor 114 or dedicated flight control processor maneuvering the inspection UAS 110 to the location of the wind turbine tower 120. The GPS coordinates of a center of the wind turbine tower 120 (treated as a cylinder) may be provided, for example. At block 230, obtaining a real-time three-dimensional model 400 (FIG. 4) or reference points includes using the scanner 112. The real-time three-dimensional model 400 is used according to one embodiment, and the reference points are used according to another embodiment, both of which are discussed with reference to block 240. According to either embodiment, the stored modeling path 310 (block 210) facilitates obtaining the scanner 112 information at a safe distance from the wind turbine tower 120. That is, when the inspection UAS 110 approaches the GPS coordinates (e.g., of the center of the wind turbine tower 120), the inspection UAS 110 cannot know the position of the blades 125 and, consequently, how to safely traverse the periphery of the wind turbine tower 120 in order to obtain the real-time three-dimensional model 400 or reference points.

Figure 3:
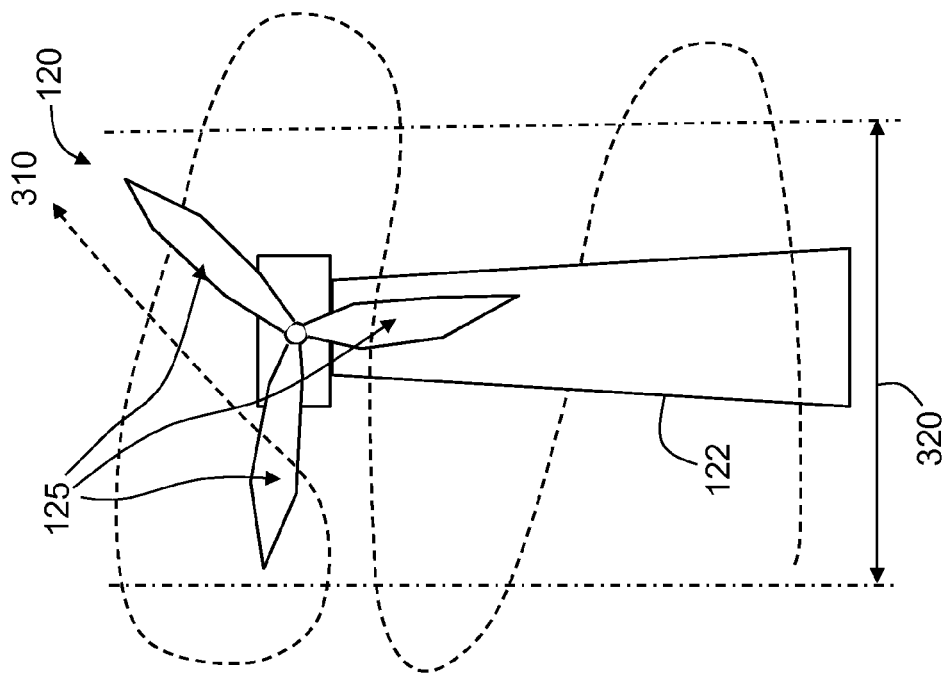
FIG. 3 depicts an exemplary stored three-dimensional model and associated flight path according to an embodiment of the invention.

FIG. 3 shows an exemplary stored modeling path 310 (block 210). The modeling path 310 is generated by treating the wind turbine tower 120 as a cylinder with a width equal to the blade 125 span, for example, such that the modeling path 310 is outside of that cylinder space. For example, the modeling flight path 310 may be provided to the inspection UAS 110 as a path outside a cylinder with a diameter of 320. The inspection UAS 110 follows the modeling path 310 to obtain the real-time three-dimensional model 400, according to one embodiment, or to obtain reference points on the wind turbine tower 120 according to another embodiment, as detailed below.

Figure 4:
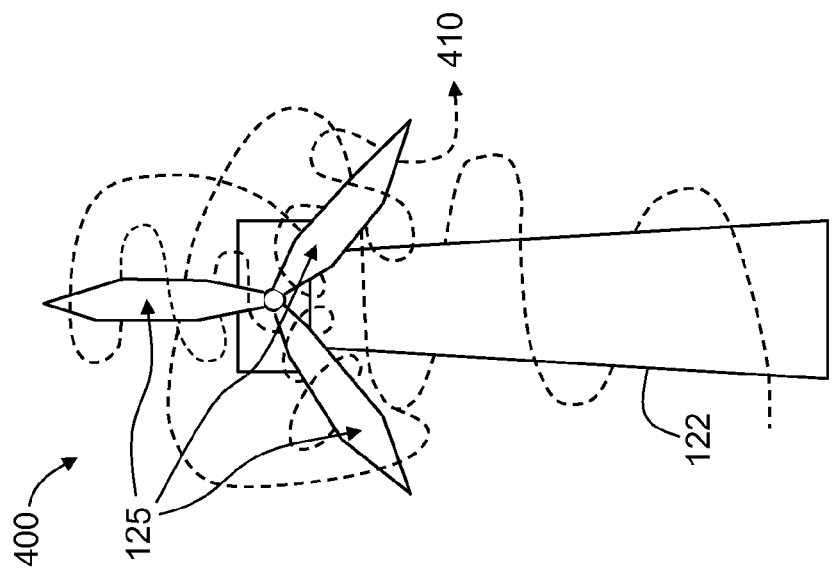
FIG. 4 depicts an exemplary real-time three-dimensional model and associated flight path according to an embodiment of the invention.
Figure 5:
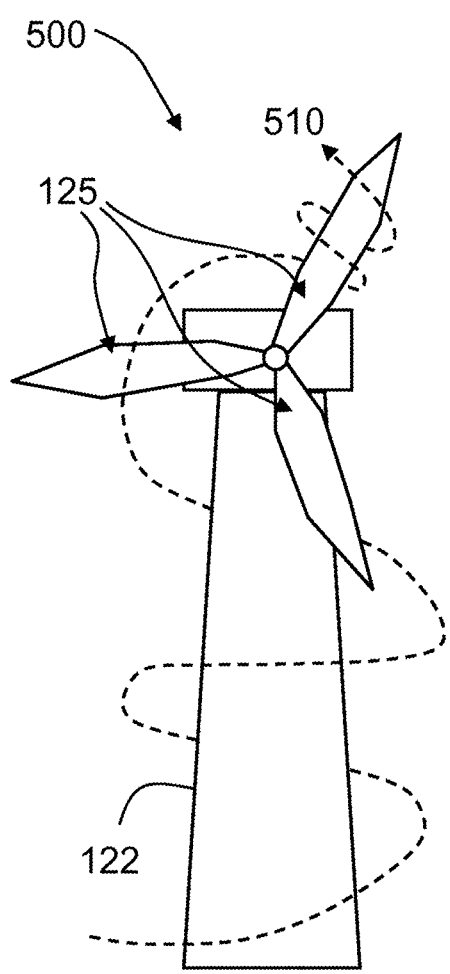
FIG. 5 depicts an exemplary stored three-dimensional model and associated stored flight path.

Returning to FIG. 2, at block 240, determining a real-time flight path 410 (FIG. 4) may be done according to one of the two exemplary embodiments discussed herein. FIG. 4 shows an exemplary real-time flight path 410 associated with a real-time three-dimensional model 400, but the real-time flight path 410 may also be obtained based on the reference points (block 230). FIG. 5 depicts an exemplary stored three-dimensional model 500 and associated stored flight path 510. FIG. 5 shows a portion of the stored flight path 510 for explanatory purposes only. A complete flight path 510, 410 facilitates inspection of every part of a wind turbine tower 120. According to the embodiment associated with FIG. 5, one or more stored flight paths 510 around the wind turbine tower 120, associated with one or more stored three-dimensional models 500, may be stored by the memory device 113, for example. The reference points (images) obtained by the scanner 112 of the inspection UAS 110 (while traversing the modeling path 310) may be used to adjust a stored flight path 510 to obtain the real-time flight path 410. That is, the orientation of the blades 125 in real-time may not match the orientation of the blades 125 associated with the one or more of the stored flight paths 510 (corresponding with the stored three-dimensional model 500). Accordingly, if the inspection UAS 110 followed one of the stored flight paths 510, the inspection UAS 110 might collide with a blade 125. Based on the reference points obtained at block 230 using the scanner 112, the processor 114 determines the real-time flight path 410 as an adjustment to the stored flight path 510, where the adjustment is based on the real-time orientation of the blades 125 compared with the orientation of the blades 125 in the stored three-dimensional model 500 associated with the stored flight path 510. To be clear, several stored flight paths 510 (and associated stored three-dimensional models 500) may be available, and the processor 114 may select the stored flight path 510 associated with an orientation of the wind turbine tower 120 (blades 125) that has the highest similarity with the real-time orientation (according to the reference points obtained at block 230) as a starting point for the determining of the real-time flight path 410 at block 240. By selecting the stored three-dimensional model 500 and associated stored flight path 510 with the nearest orientation to real-time conditions, the adjustment to the stored flight path 510 needed to obtain the real-time flight path 410 would be reduced. The specific processing used by the processor 114 to adjust the stored flight path 510 to obtain the real-time flight path 410 based on the obtained reference points is not limited to any particular known technique.

FIG. 4 depicts an exemplary real-time three-dimensional model 400 and associated real-time flight path 410 according to an embodiment of the invention. FIG. 4 illustrates an embodiment of determining the real-time flight path 410 without beginning with a stored flight path as discussed above. According to the embodiment illustrated by FIG. 4, a real-time three-dimensional model 400 of the wind turbine tower 120 is obtained based on the inspection UAS 110 traversing the modeling flight path 310 (block 230). Based on the real-time three-dimensional model 400, the real-time flight path 410 is developed. The development of the real-time flight path 410 using the real-time three-dimensional model 400 may be rule-based, for example, but is not limited to any particular technique. According to a rule-based example, the rule might specify beginning the real-time flight path 410 at a portion of the wind turbine tower 120 that is closest to the ground, spiraling up around the base 122, around each of the blades 125, and around a housing of the other components 127, as shown in FIG. 4. The processor 114 processing the stored flight paths 510 and obtained reference points or the obtained real-time three-dimensional model 400 according to the embodiments described above has the technical effect of determining the real-time flight path 410 for the inspection UAS 110 to inspect the wind turbine tower 120.

Once the processor 114 has determined the correct real-time flight path 410, inspecting and obtaining the textural overlay at block 250 (FIG. 2) involves using the camera 111 to inspect the wind turbine tower 120. That is, a high resolution image may be overlaid on the real-time three-dimensional model 400 and sent via the interface 115 to the monitoring or control site 117. Based on the images, the blade 125 condition and any structural damage may be assessed, and further imaging may be ordered via the interface 115, as needed.

The inspection UAS 110 traverses a path (the real-time flight path 410) such that every part of the exterior of the wind turbine tower 120 may be inspected and imaged. In addition, while a single inspection UAS 110 is discussed as performing the determination of the real-time flight path 410 and performing the inspection (obtaining the camera 111 images), the navigation determination and the inspection may be performed by separate inspection UASs 110. That is, one inspection UAS 110 may perform the determination of the real-time flight path 410 and transmit that information (via the communication interface 115) to a second inspection UAS 110 that performs the imaging with the camera 111 while the first inspection UAS 110 moves on to determine the real-time flight path 410 for the next wind turbine tower 120. The functionality described herein is not limited to being performed with any particular number of inspection UASs 110.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of inspecting equipment with an unmanned aircraft system (UAS), the method comprising:
    obtaining images of the equipment;
    obtaining, from a memory device, stored information for the UAS;
    determining, using a processor, a real-time flight path for the UAS based on the images and the stored information;
    obtaining camera images of the equipment, using a camera of the UAS, while traversing the real-time flight path with the UAS,
    wherein the stored information includes rules to generate the real-time flight path, and the determining the real-time flight path includes processing the images to obtain a real-time three-dimensional model of the equipment and applying the rules to the real-time three-dimensional model, and
    overlaying the camera images on the real-time three-dimensional model as a textural overlay.

2. The method according to claim 1, further comprising the UAS flying from a remote location to the equipment based on global positioning system (GPS) coordinates of the equipment.

3. The method according to claim 1, wherein the obtaining the images includes scanning the equipment with a laser scanner.

4. The method according to claim 1, further comprising transmitting, using an interface of the UAS, the camera images of the equipment.

5. The method according to claim 1, wherein the inspecting the equipment includes inspecting wind turbine towers of a wind farm.

6. A non-transitory computer-readable medium on an unmanned aircraft system (UAS) storing instructions which, when processed by a processor of the UAS, cause the processor to implement a method of inspecting equipment, the method comprising:
    obtaining images of the equipment;
    obtaining stored information for the UAS;
    determining a real-time flight path for the UAS based on the images and the stored information;
    obtaining camera images of the equipment, using a camera of the UAS, while traversing the real-time flight path with the UAS,
    wherein the stored information includes rules to generate the real-time flight path, and the determining the real-time flight path includes processing the images to obtain a real-time three-dimensional model of the equipment and applying the rules to the real-time three-dimensional model, and
    overlaying the camera images on the real-time three-dimensional model as a textural overlay.

7. The non-transitory computer-readable medium according to claim 6, further comprising transmitting the camera images of the equipment.

8. The non-transitory computer-readable medium according to claim 6, wherein the inspecting the equipment includes inspecting wind turbine towers of a wind farm.

\* \* \* \* \*